United States Patent [19]

Berthiez

[11] 3,841,200

[45] Oct. 15, 1974

[54] PRODUCTION OF BODIES OF REVOLUTION

[76] Inventor: Charles William Berthiez, 5 Ave. Eglantine, Lausanne, France

[22] Filed: Jan. 26, 1973

[21] Appl. No.: 327,135

Related U.S. Application Data

[62] Division of Ser. No. 50,422, June 29, 1970, Pat. No. 3,741,070.

[30] Foreign Application Priority Data

June 30, 1969 France .............................. 69.22059
Oct. 9, 1969 France .............................. 69.34620

[52] U.S. Cl. ................... 90/15 R, 90/16, 90/DIG. 1, 82/2 D
[51] Int. Cl. ........................... B23c 1/12, B23c 1/14
[58] Field of Search .............. 90/15 R, 16, 17, 11 R, 90/DIG. 1, 15 B; 82/2 D; 51/50 R, 56

[56] References Cited
UNITED STATES PATENTS 2,504,968   4/1950   Eklund................................... 90/17
3,264,905   8/1966   Erikson.............................. 90/16 X
3,602,093   7/1968   Fisher................................... 90/15

*Primary Examiner*—Gil Weidenfeld
*Attorney, Agent, or Firm*—Fitzpatrick, Cella, Harper & Scinto

[57] ABSTRACT

A method and machine for machining bodies of revolution in which the part to be machined is rotated about its axis and is machined by means of a milling tool mounted on the end of a rotating spindle, whose axis is essentially perpendicular to the axis of the part to be machined, the milling tool being displaceable along a path parallel to the axis of the part, and the milling tool being adustable in height by displacement of its axis of rotation along a plane perpendicular to the axis of the part to be machined.

2 Claims, 15 Drawing Figures

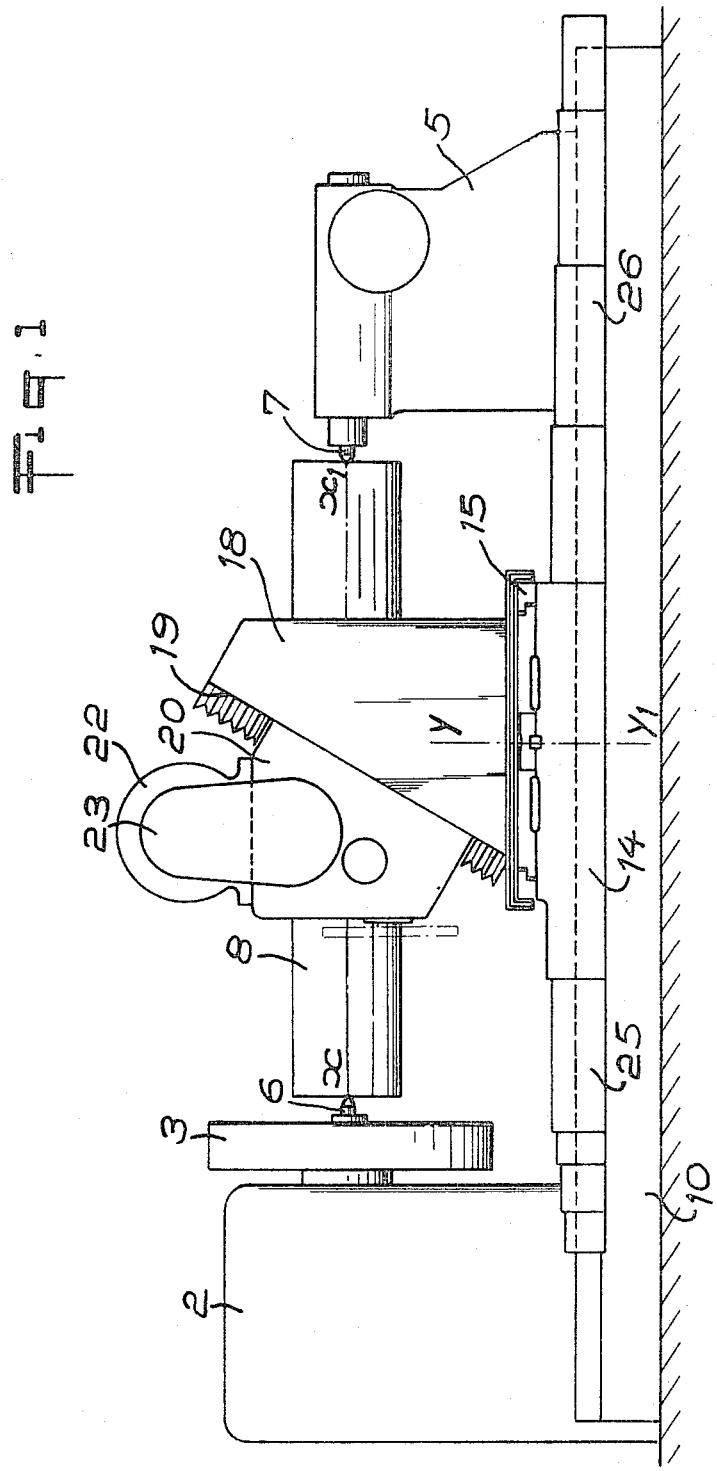

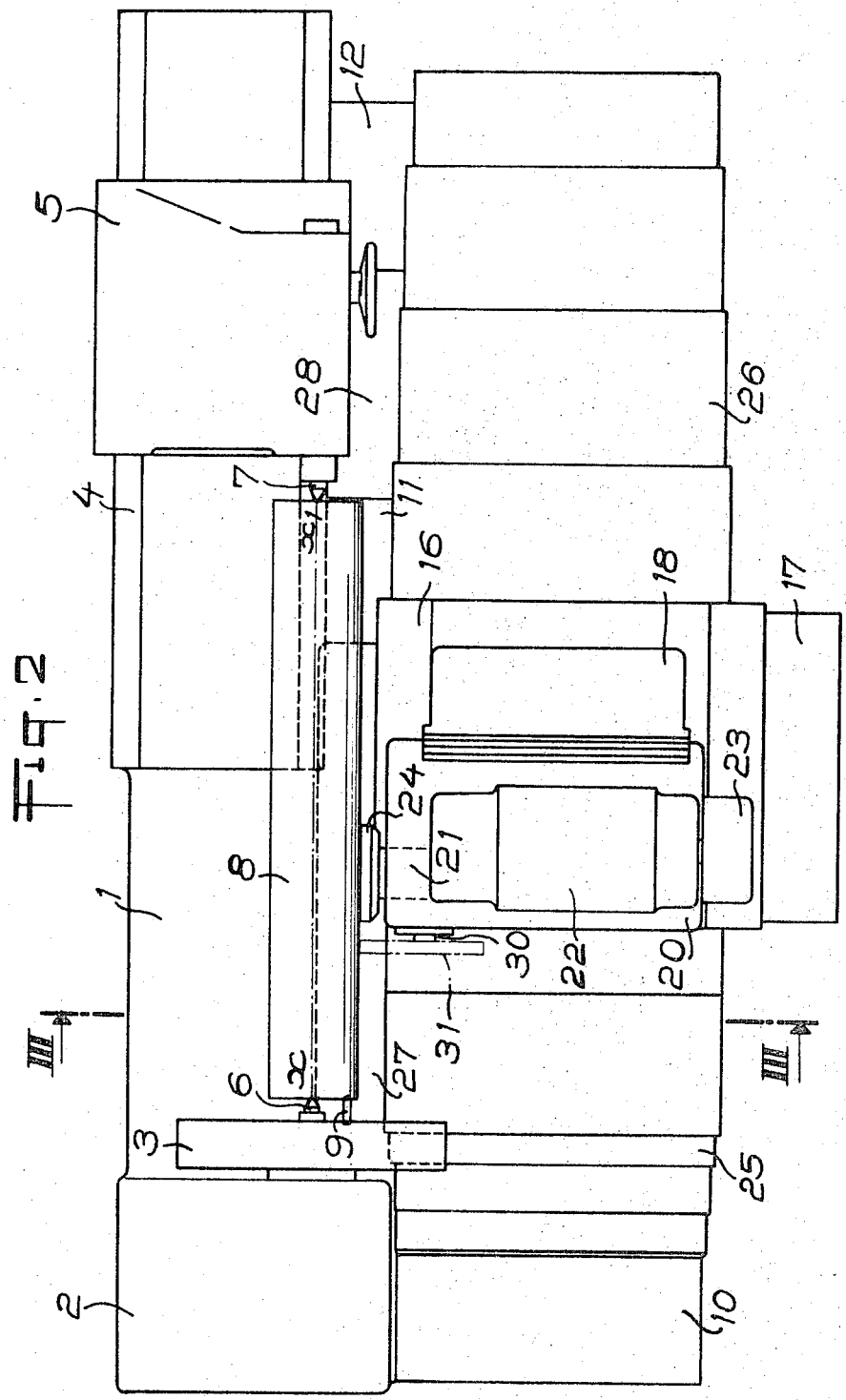

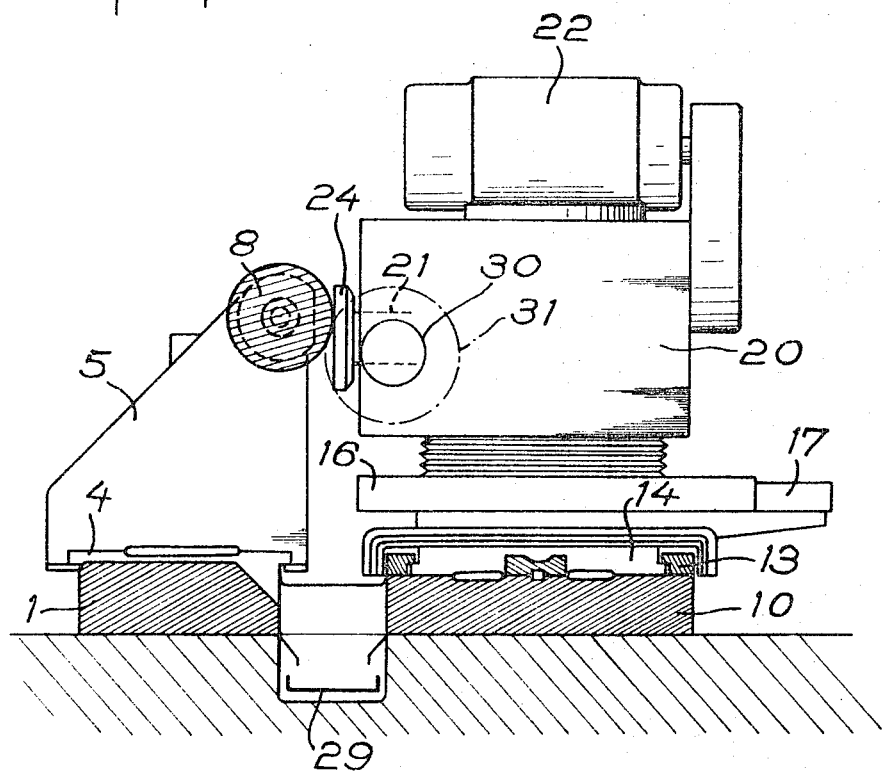

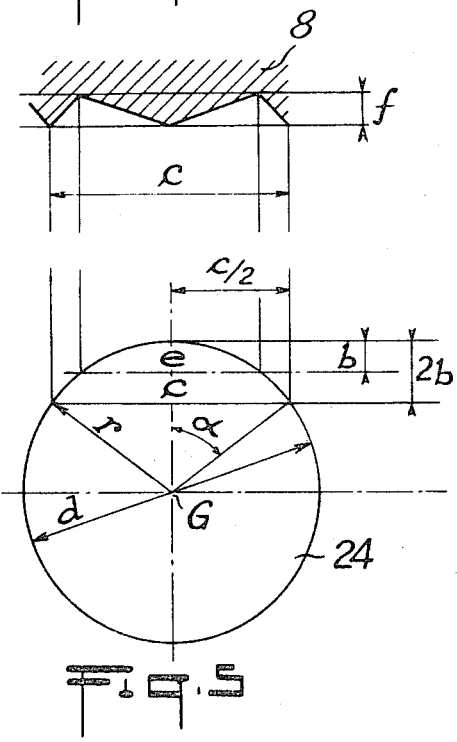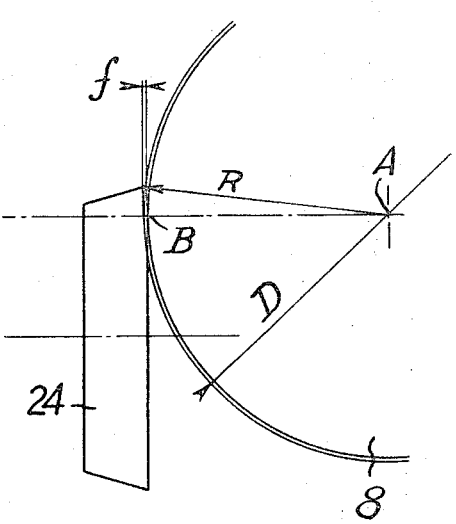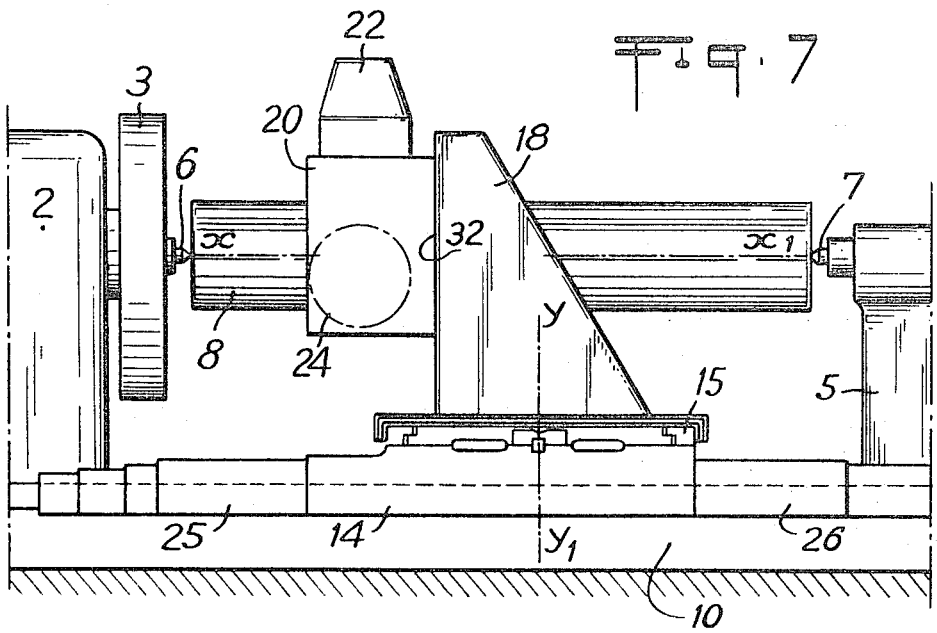

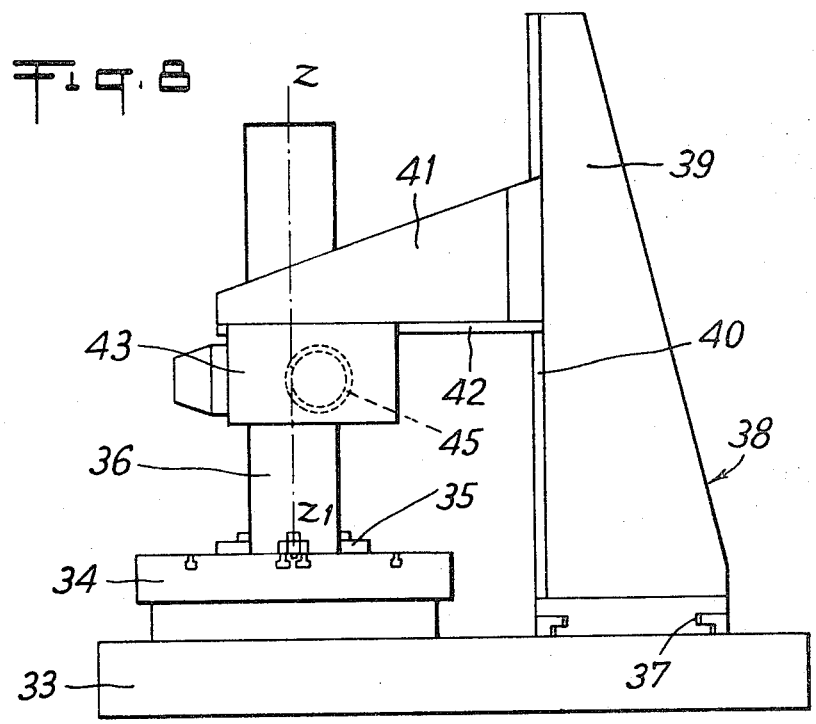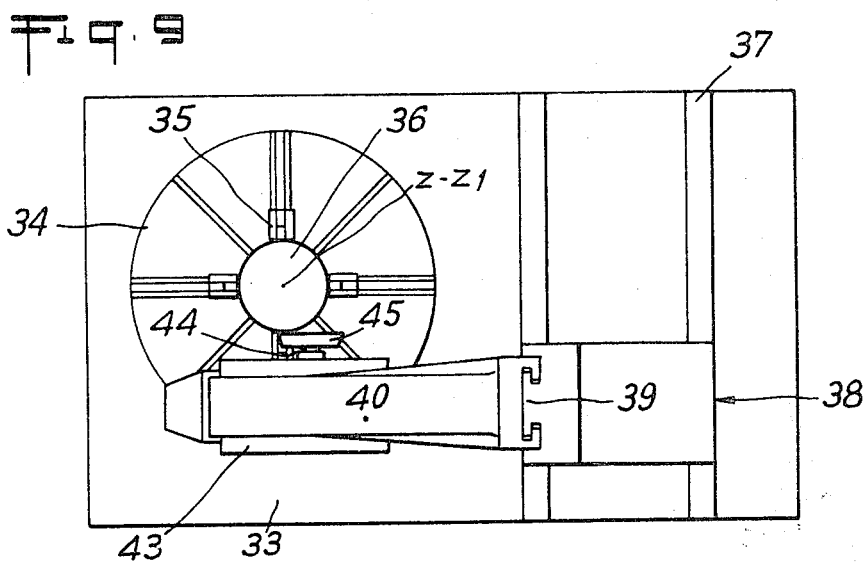

PRODUCTION OF BODIES OF REVOLUTION

This is a division of application Ser. No. 50,422, filed June 29, 1970 now U.S. Pat. No. 3,741,070.

The present invention relates to a method of and machine for machining bodies of revolution.

The machining of bodies of revolution is at present carried out on a lathe mainly by means of stationary tools with one or more cutting edges. Moreover, since present industrial trends are towards the replacement of planing machines by milling machines, it seems rational to envisage the use of milling tools in place of lathe tools for carrying out the machining of bodies of revolution.

However, the principal operations of machining the surfaces of revolution are always carried out by means of a lathe tool with a single cutting edge.

The method according to the present invention more often than not makes it possible to eliminate the lathe tool with a single cutting edge and to replace the latter by a milling tool, the advantages of such a method being numerous.

In order that its output may be competitive, the lathe tool must work with considerable sections of shaving (up to 70 to 80 mm$^2$) and this results in considerable cutting forces (10 to 20,000 kg) which subject the slides, the spindle and possibly the loose tail-stock and the transmission members of the lathe to considerable fatigue. Similarly, the parts to be machined are subjected to stress and are often deformed.

By way of contrast since milling tools comprise numerous cutting members or teeth working together the forces applied to the components of the machine are substantially less.

In addition, the shavings produced by a lathe tool are in the shape of long ribbons, certain of which are of large section which, when coiled in a spiral, are difficult to remove, and sometimes even dangerous for the operator, whereas the shavings from milling which are always in the shape of small shells are much easier to handle.

On the other hand, the cutting members or teeth of a milling tool are cooled during their passage at each revolution of the milling tool in the air, whereas the lathe tool is constantly engaged in the part to be machined during cutting and therefore it is not possible to have as effective a cooling of the cutting part or tooth.

Since, during each rotational passage, each cutting member or tooth of a milling tool only removes a shaving representing a small fraction of that which a lathe tool would remove, it produces substantially less fatigue. These different conditions make it possible to work with the milling tool for longer periods between sharpening and/or to work at greater cutting speeds. Finally, and for the same reasons, a milling tool can work harder metals than the lathe tool.

A lathe tool is particularly sensitive to vibrations which reverberate in the machine and on the part to be machined and this generally limits the production, whereas a milling tool which produces interrupted cuts as opposed to a continuous cut, and a progressive engagement and disengagement of each tooth, eliminates the vibration resonances which might be produced.

It is known to use on a lathe for various particular machining operations, a milling tool mounted on a spindle, the axis of which is essentially parallel or angularly adjustable in relation to the axis of rotation of the revolving part to be machined, in particular in screw-cutting operations by configured milling cutters.

It is also known to use a method of machining bodies of revolution in which the part to be machined is rotated about its axis and is machined by means of a milling tool mounted at the end of a rotating spindle, the axis of which is essentially perpendicular to the axis of the part to be machined, the milling tool being displaced along a trajectory parallel to the axis of the part.

Nevertheless, in this method, the axis of the milling tool cannot be adjusted in height in relation to the axis of the part to be machined, and the result is that the method cannot be applied to all cases of machining bodies of revolution which occur. This is one of the main reasons which have limited the use of this method of machining by milling, as a replacement for machining by a conventional lathe tool.

According to the present invention, the milling tool is adjustable in height due to a displacement of its axis of rotation, along a plane perpendicular to the axis of the part to be machined.

It has been stated that the shape produced by the milling tool on the surface of the cylinder presents an undulation comprising a certain depth $f$ and the present invention seeks to reduce as much as possible the said depth of the undulations. But, in the course of experiments, it has been apparent that the milling of a body of revolution, in particular of a cylinder, by means of a surface milling tool may produce on the surface of the cylinder this undulated shape which is dependent on the diameter of the cylinder to be machined, on the diameter of the milling tool, and on the position of the axis of the milling tool in relation to the axis of the cylinder to be machined. It is thus necessary to use a device facilitating an adjustment of the distance between the axes of the cylinder to be machined and of the milling tool, depending on the diameters of the cylinder to be machined and the milling tool.

In this way, it is possible, by varying the relative position between the axes of the part to be machined and of the milling tool, to choose for a rough machining of the part, milling tools of a diameter making it possible to obtain cut widths for the use of great power and for final machining to choose, according to the diameter of the part to be machined and of the milling tool, the optimum position for obtaining with the maximum advance of the milling tool per revolution of the part, the minimum value of the depth of undulation and consequently the obtainment of a machined surface approaching as near as possible a theoretical cylinder.

Embodiments of the present invention will now be described, by way of example, with reference to the accompanying drawings, in which:

FIG. 1 is a side elevation of a machine for machining bodies of revolution according to the method of the invention;

FIG. 2 is a plan view of the machine;

FIG. 3 is a sectional view of the machine on the line III—III of FIG. 2;

FIG. 4 is a diagrammatic view showing the relative position of the part to be machined and of the milling tool in a plane perpendicular to the axis of the part;

FIG. 5 is a diagrammatic view of the part and of the milling tool moved through 90° in relation to FIG. 4;

FIG. 6 is a sectional view of the shape of the part showing the undulation of the shape obtained;

FIG. 7 is a side elevation of a machine comprising a milling head with vertical slides;

FIG. 8 is an elevation of a machine with a vertical axis for machining parts of revolution;

FIG. 9 is a plan view of the machine shown in FIG. 8;

Figure 11:
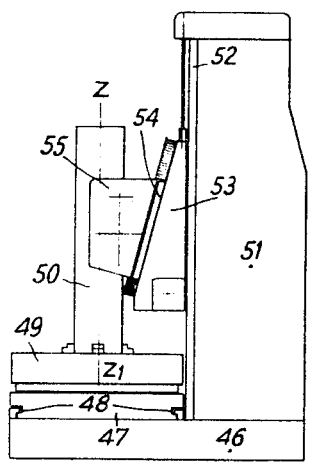
FIG. 11 is a side elevation of the machine shown in FIG. 10.

In FIGS. 1, 2 and 3 there is shown a machine according to the invention which comprises a first lathe bed 1 on which is mounted, in known manner, at one of its ends a fast head-stock 2 comprising a rotating plate 3. The lathe bed 1 has longitudinal slides 4 intended to receive a loose head-stock 5. The plate 3 and the loose head-stock 5 are provided respectively with a centre 6 and a tail-stock 7 between which is mounted a part 8 to be machined the part being of cylindrical shape constituting a body of revolution, the rotation of the part 8 about its longitudinal axis $xx_1$ being ensured by a dog 9 located between the plate 3 and the part 8. It would also be possible to mount the part 8 in the jaws of the plate 3 in order to ensure its rotation.

Parallel to the axis $xx_1$ of the part 8, there is located a second bed 10 fixed on one side to the fast head-stock 2 and connected at the other side to the bed 1 by spacing pieces 11 and 12. The second bed 10 has slides 13 protected by slide-covers 25, 26 and on which is slidably mounted longitudinally parallel to the axis $xx_1$ of the part 8 a cross-slide 14 comprising transverse slides 15 protected by slide-covers 16, 17 and on which is mounted to slide transversely a carriage comprising an upright 18 having an inclined plane 19 on which slides a milling head 20 including a spindle 21 rotated by a motor 22, a belt-drive 23 and a gear box located in the milling head 20.

At the end of the spindle 21 there is mounted a milling tool 24 which is likely to come into contact with a generatrix of the part 8 to be machined. The axis of the spindle 21 on which is mounted the milling tool 24, is substantially perpendicular to the axis $xx_1$ of the part 8 to be machined.

In order to machine the cylindrical part of revolution 8, the latter is rotated about its axis $xx_1$ due to the plate 3 and the milling tool 24 being rotated, the upright 18 supporting the milling head is displaced transversely on the slides 15 until the milling tool 24 comes into contact with a generatrix of the part 8, with a view to varying its diameter. On the other hand, the milling head 20 may be displaced longitudinally parallel to the axis $xx_1$, of the part 8 by means of the cross-slide 14 supporting the upright 18 and guided by the slides 13, so as to produce bodies of revolution of cylindrical shape.

For machining a cone, the movement of the upright 18 on the slides 15 is correlated with that of the cross-slide 14 on the bed 10 by known means.

Similarly, it is also possible to pivot, by known means, the upright 18 about a vertical axis $yy_1$, in order to modify by a certain angle the position of the axis of the spindle 21 supporting the milling tool 24, in order that the axis of the milling tool remains perpendicular to the generatrix of the cone.

The shavings may fall directly into a conveyor 29 arranged between the beds 1 and 10 through the spaces 27, 28 separating the spacer parts 11, 12.

The milling head 20 may also be provided with a second spindle 30 parallel to the axis $xx_1$, of the part 8 for working with formed or configured milling tools 31 or milling tools for cutting grooves and sections.

In FIGS. 4 and 5, there is shown the part 8, during machining, of machined diameter D and a milling tool 24 of diameter $d$ which is tangential at 13 along a chord $e$ with the part 8 to be machined.

The chord $c$ which represents the width of the cut or the longitudinal advance of the milling tool per revolution of the part 8, is linked to the value of the arrow $b$ of the chord $e$ which corresponds to half the arrow $2b$ of the chord $c$ in order that the depth $f$ of the undulations is minimal.

In addition, this value of the arrow $b$ depends on the relative position of the axis A of the part 8 and of the axis G of the milling tool 24.

The relationship between these different dimensions is as follows:

$$\sin \alpha = c/2r$$

with $d = 2r$ $$\cos \alpha = \sqrt{1 - (c/2r)^2}$$

$$2b = r - r \cos \alpha = r(1 - \cos \alpha) = r(1 - \sqrt{1 - (c/2r)^2})$$

hence the result is that:

$$b = r\,[1 - \sqrt{1 - (c/2r)^2}]/2$$
$$b = d\,[1 - \sqrt{1 - (c/d)^2}]/4$$

According to this formula, it is clear that $b$ depends on the diameter $d$ of the milling tool 24.

Moreover, in FIG. 6 there is shown the sectional view of the profile of the machined part which shows the undulation of the profile and the depth $f$ of the undulation.

Referring to FIG. 4, on which there is shown the value of the depth $f$ of the undulation of the shape, one may define the following relationships:

$f = R - AB$ with
$D = 2R$
$f = R - \sqrt{R^2 - b^2}$
$f = D/2 - \sqrt{(D/2)^2 - b^2}$ The above formula shows that the value of $f$ depends on the diameter D of the part 8 and of the distance between the axes A of the part 8 and G of the milling tool 24.

From the above formula, it is thus possible to fix the value $f$ of the depth of the undulation which corresponds best to machining, either for a rough operation or for a finishing operation depending on the diameter D of the finished part, of the diameter $d$ of the milling tool 24 and of the distance between centres of the part 8 and the milling tool 24.

In FIG. 7, there is shown a modification of the machine according to the invention, in which the milling head 20 is mounted on the carrige 18 by means of vertical slides 32.

This arrangement makes it possible as in the case of FIG. 1, to adjust in height the position of the milling tool 24 and consequently the distance between the centres of the part 8 and the milling tool 24.

In the preceding embodiments, there is shown the application of the method on a lathe with a horizontal axis, but it is obvious that this method can also be used with a vertical lathe.

In FIGS. 8 and 9, there is shown a machine with a vertical axis comprising a lathe bed 33 on which is rotatably mounted, along a vertical axis $zz_1$ a lathe plate 34 on which is fixed, in known manner, by means of jaws 35 a part 36 of cylindrical shape to be machined.

On the bed 33 is provided slides 37 for the longitudinal guidance of a carriage 38 constituted by an upright 39 and a beam 41 which is slidably mounted on a vertical slide 40 of the upright 39.

The beam 41 has a horizontal slide 42 on which there is slidably mounted a milling head 43 comprising a horizontal rotating spindle 44 on which is fixed a milling tool 45 able to come into contact with a generatrix of the part to be machined 36.

Since the milling head 43 is adjusted in position in relation to the axis $zz_1$ according to the above-mentioned details, and the milling tool 45 is rotated about its axis, the beam 41 is displaced vertically on the slide 40, in such a way that the milling tool 45 is displaced along a trajectory parallel to the axis $zz_1$ of the part 36.

Figure 10:
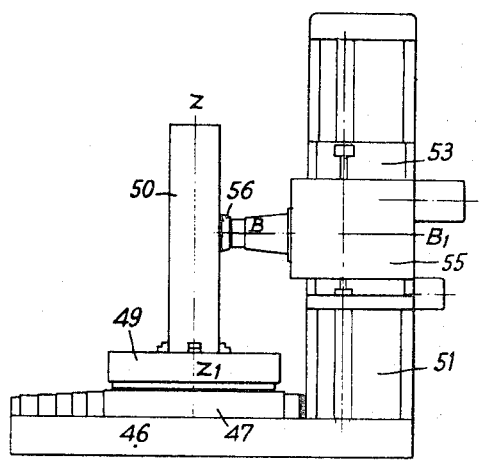
FIG. 10 is a front elevation of a machine with inclined slides on which is mounted a spindle support carriage.
Figure 12:
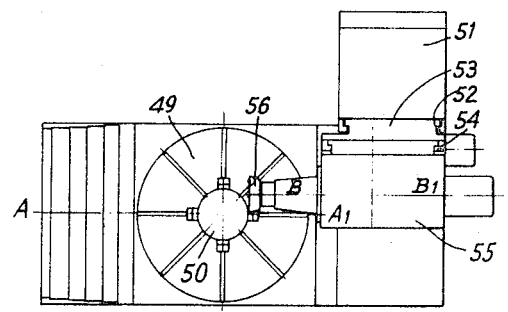
FIG. 12 is a plan view of the machine shown in FIG. 10.

The machine, shown in FIGS. 10, 11, 12 comprises a bed 46 provided with slides 48 on which there is slidably mounted, along an axis $AA_1$ parallel to the axis $BB_1$ of the spindle, a carrige 47 supporting a rotating lathe plate 49 with a vertical axis $zz_1$ on which there is mounted the part 50 to be machined.

The bed 46 also supports a stationary upright 51 which is provided on its front side with slides 52 intended to receive a main slide 53 displacing vertically.

The main carriage 53 comprises inclined slides 54 by means of which there is slidably mounted a spindle carriage 55 on which is rotatably mounted, on the axis $BB_1$ a milling tool 56.

The positioning of the milling tool 56 in relation to the part 50 to be machined is obtained by the displacement of the carriage 47 supporting the rotating plate, on the axis $AA_1$, by the vertical displacement of the main carriage 53 and by the displacement of the spindle carriage 55 on the inclined slides 54, along a plane perpendicular to the axis $zz_1$, of the part 50 to be machined.

Figure 14:
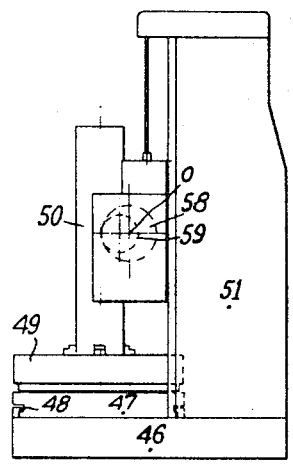
FIG. 14 is a side elevation of the machine shown in FIG. 13.
Figure 13:
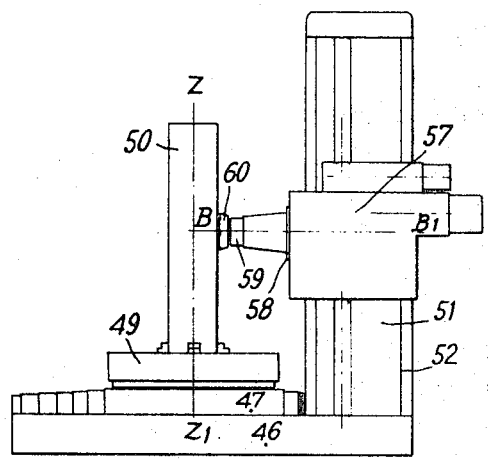
FIG. 13 is a front elevation of a machine in which the spindle is mounted eccentrically.
Figure 15:
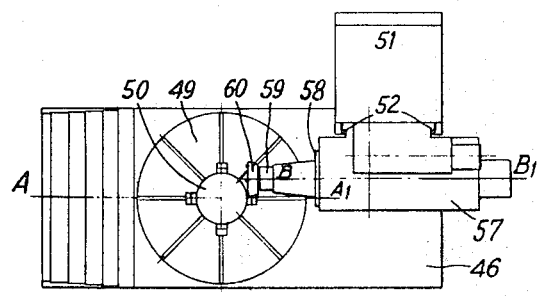
FIG. 15 is a plan view of the machine shown in FIG. 13.

In the embodiment of the machine, shown in FIGS. 13, 14 and 15, there is the same arrangement as that described above, and illustrated in FIGS. 10, 11 and 12, as regards the mounting of the rotating plate 49 on a sliding carriage 47 along an axis $AA_1$ on the bed 46.

The stationary upright 51 is provided, as previously, with slides 52 on which runs a main carriage 57 displacing vertically, provided with a cylindrical sleeve 58 in which there is mounted, eccentrically, a spindle 59 supporting the milling tool 60.

This arrangement facilitates besides the vertical adjustment of the main carriage 57, an adjustment of the axis of the milling tool 60 on a plane perpendicular to the axis $zz_1$ of the part to be machined, by the rotation of the cylindrical sleeve 58 about its central axis O.

It is possible to employ the method according to the present invention on a standard milling-boring machine, either with a loose upright, or with a table of the slabbing type, or with a table on crossed slides, on condition that the machines comprise a turning plate which moves automatically.

In the first case, the adjustment of the head takes place by means of the displacement of the upright on its base and in the two other cases by a displacement of the table.

In addition, it is to be noted that the machine with a horizontal axis may be provided with a carriage and an additional turning cutter or that there may be fixed on the milling head of horizontal or vertical machines a tool holder for carrying out work with a shaped or configured tool on each occasion where this would be more economical than a special milling.

Naturally, various modifications may be made without departing from the scope of the accompanying claims.

What is claimed is:

1. A machine for machining a body of revolution comprising in combination a bed having horizontal slide means, a carriage mounted to slide on said slide means, a lathe plate, means mounting said lathe plate on said carriage spindle rotation on a vertical axis during the time of machining said body of revolution, a stationary upright mounted on said bed, said stationary upright having vertical slide means on its front face, a main carriage slidably mounted on said vertical slide means, spindle means, a milling tool carried by said spindle means, and means for mounting said spindle means on said main carriage for displacement relative to said main carriage in a plane inclined to said vertical axis, said means for mounting said spindle means on said main carriage comprising inclined slides on said carriage for slidably receiving said pindle means.

2. A machine for machining a body of revolution comprising in combination a bed having horizontal slide means, a carriage mounted to slide on said slide means, a lathe plate, means mounting said lathe plate on said carriage for rotation on a vertical axis during the time of machining said body of revolution, a stationary upright mounted on said bed, said stationary upright having vertical slide means on its front face, a main carriage slidably mounted on said vertical slide means, spindle means, a milling tool carried by said spindle means, and means for mounting said spindle means on said main carriage for radial displacement relative to said main carriage, said spindle means and said means for mounting said spindle means on said main carriage comprising a cylindrical rotating sleeve carried by said main carriage, and an eccentrically mounted spindle mounted on said cylindrical rotation sleeve co-acting therewith to effect said radial displacement, and said milling tool being mounted on said spindle.

* * * * *

UNITED STATES PATENT OFFICE
CERTIFICATE OF CORRECTION

Patent No. 3,841,200      Dated October 15, 1974

Inventor(s) CHARLES WILLIAM BERTHIEZ

It is certified that error appears in the above-identified patent and that said Letters Patent are hereby corrected as shown below:

In the Abstract, line 8, change "adustable" to
-- adjustable --.

Column 4, line 53, change "$f = R - R^2-b^2$" to
-- $f = R - \sqrt{R^2-b^2}$ --;
line 54, change "$f = D/2 - (D/2)^2-b^2$" to
-- $f = D/2 - \sqrt{(D/2)^2-b^2}$ --.

Column 6, line 31, change "spindle" to -- for --;
line 42, change "pindle" to -- spindle --.

Signed and sealed this 7th day of January 1975.

(SEAL)
Attest:

McCOY M. GIBSON JR.
Attesting Officer

C. MARSHALL DANN
Commissioner of Patents